United States Patent Office.

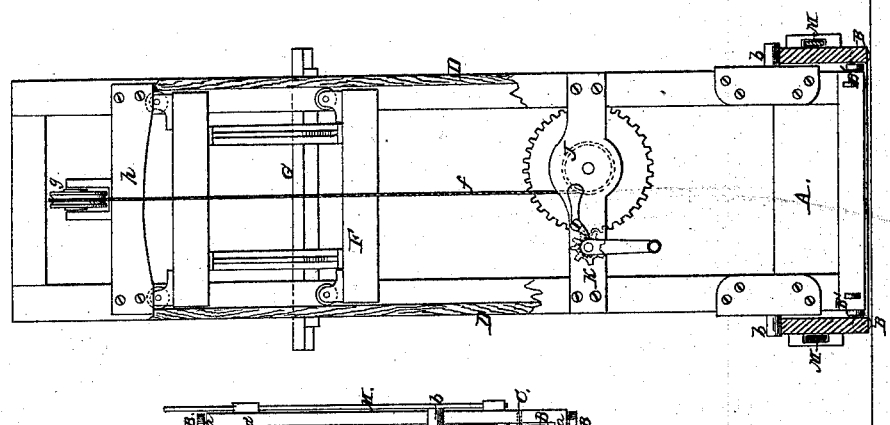
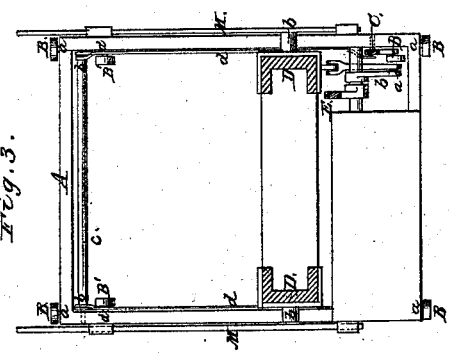
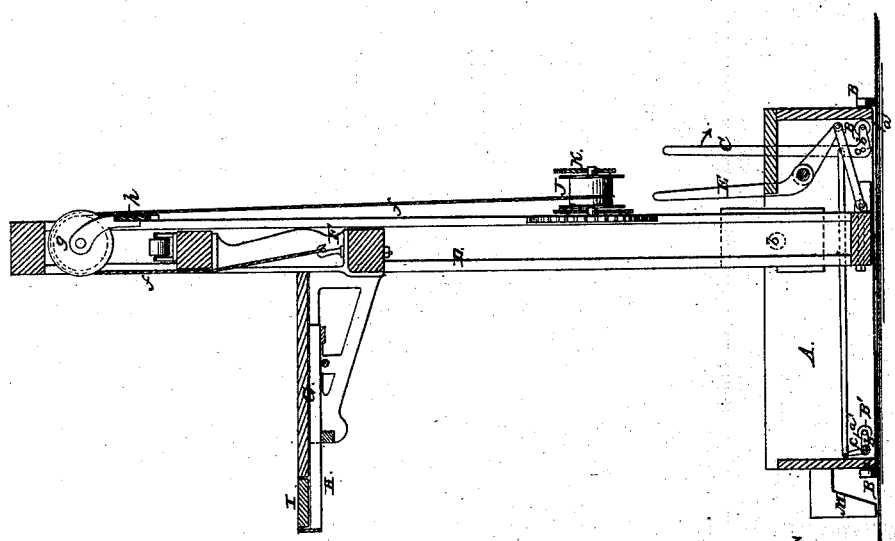

R. M. VAN SICKLER, OF NEW YORK, N. Y.

Letters Patent No. 62,098, dated February 12, 1867.

---

IMPROVEMENT IN ELEVATORS.

---

*The Schedule referred to in these Letters Patent and making part of the same.*

---

TO ALL WHOM IT MAY CONCERN:

Be it known that I, R. M. VAN SICKLER, of the city, county, and State of New York, have invented a new and improved Elevator; and I do hereby declare that the following is a full, clear, and exact description thereof, which will enable others skilled in the art to make and use the same, reference being had to the accompanying drawing, forming part of this specification, in which—

Figure 1 represents a longitudinal vertical section of this invention.
Figure 2 is a transverse section thereof.
Figure 3 is a horizontal section of the same.
Similar letters of reference indicate like parts.

This invention relates to an elevator for stores and other localities, said elevator being placed on a car in such a manner that it can be readily pushed to the desired spot, and a box or other heavy article can be raised and deposited in the required place. The car is provided with two sets of wheels, the axles of which are at right angles to each other; and one set of these wheels is so arranged that they can be raised or depressed, and that by these means either set of wheels can be brought in operation at will. The platform, which serves to receive the goods to be elevated, is secured to a carriage which travels in vertical tracks and is provided with suitable friction-wheels to facilitate its motion. The tracks are connected and hung on gudgeons, so that they can be adjusted at any desired inclination, and the platform is provided with an extension, whereby the loading and unloading of goods in some localities is facilitated.

A represents a car, which is made of wood, or any other suitable material, and in any desirable shape and size. This car is provided with two sets of wheels, B B', the axles $a$ of the wheels B being rigidly attached to the sides of the car, while the axles $a'$ of the wheels B', which are placed at right angles to the axles $a$, have their bearings in the ends of elbow-levers $b$, which have their fulcra on round bars or pivots, $c$, and are connected by suitable rods, $d$, so that they can be moved simultaneously by the action of a hand-lever, C. By throwing this hand-lever in the direction of the arrow marked near it in fig. 1 of the drawing, the wheels B' are depressed on the ground and the car is raised, so that the same, instead of being supported by the wheels B, rests on the wheels B', and can be moved in a direction at right angles to that in which it moves on the wheels B. From the car rise two grooved tracks D, which are connected by suitable cross-bars and provided with gudgeons, $b$, so that they can be adjusted in a vertical or in an oblique position, as occasion may require. Said gudgeons have their bearings in suitable boxes secured to the car A, and a hand-lever, E, may be connected to said tracks, whereby the operation of adjusting the same may be facilitated. If desired, the tracks may be rigidly connected to the car, and said tracks may be made in sections to be connected by couplings, so that they can be shortened or lengthened. The grooved tracks form the guides for a carriage, F, to which the platform G is attached, which is intended to receive the goods to be elevated or lowered. Said carriage is made of wood and iron combined, or of any other suitable material; and it is provided with friction-wheels on top and bottom, (see fig. 2,) so that it works easily up and down in the tracks, and said tracks themselves keep the carriage in the proper position while being raised or lowered. The platform G is rigidly attached to the carriage, and it is provided with slides, H, which, when drawn out, receive and support an extension piece, I. By this extension of the platform the operation of loading and unloading goods from the platform is materially facilitated. It must be remarked that the extension of the platform can be effected in various different ways, and I do not wish to confine myself in this respect to the precise arrangement shown in the drawing. When the extension platform is used, two sliding feet, M, attached to the sides of the car A, are drawn out to prevent the same from tipping over if the weight of the goods bears on the extreme end of the platform. The carriage F is suspended from a chain, $f$, which passes over a roller, $g$, and thence down to a windlass, J. The roller $g$ is supported by a cross-bar, $h$, that is fastened to the tracks D, near their upper ends, and the windlass is secured in a cage, K, which is attached to the back of the tracks, or in some cases it may be preferable to have the windlass on the same side with the platform and connected to the same or to the carriage F, so that persons standing on the platform can raise and lower themselves without difficulty, or said windlass may be secured in any other convenient position. In practice, two chains will be used instead of one, and the drums or windlasses on which they wind will be connected by gear-wheels, so that they can be operated by one and the same crank.

This elevator is of particular advantage for stores and warehouses where heavy boxes have to be piled up in tiers, and many times a box has to be taken down or put up in a very narrow space, requiring four or five men to perform the operation, while one man, with the aid of my elevator, can do the work in less time and without particular exertion.

Having thus described my invention, I claim as new, and desire to secure by Letters Patent—

1. A portable elevator, consisting of a car or truck mounted on two sets of wheels, substantially as described, with grooved tracks or guide-posts mounted thereon, and a carriage or platform supported by and moving in connection with said posts, substantially as herein shown and described.

2. I claim having the tracks or guide-posts made adjustable, substantially as and for the purpose herein shown and described.

R. M. VAN SICKLER.

Witnesses:
  WM. F. MCNAMARA,
  W. HAUFF.